United States Patent [19]

Wanner et al.

[11] 4,431,062

[45] Feb. 14, 1984

[54] ROTATING DRIVE FOR IMPACT HAMMER

[75] Inventors: Karl Wanner, Echterdingen; Manfred Bleicher, Leinfelden, both of Fed. Rep. of Germany

[73] Assignee: Robert Bosch GmbH, Stuttgart, Fed. Rep. of Germany

[21] Appl. No.: 195,142

[22] PCT Filed: May 4, 1979

[86] PCT No.: PCT/EP79/00033

§ 371 Date: Jan. 9, 1980

§ 102(e) Date: Dec. 26, 1979

[87] PCT Pub. No.: WO79/01041

PCT Pub. Date: Nov. 29, 1979

[51] Int. Cl.³ .......................... B25D 11/10; B23B 45/02

[52] U.S. Cl. .......................... 173/104

[58] Field of Search .......................... 173/123, 118, 104

[56] References Cited

U.S. PATENT DOCUMENTS

| | | | |
|---|---|---|---|
| 1,505,493 | 8/1924 | Roberts | 173/123 |
| 2,492,840 | 12/1949 | Bugg . | |
| 2,657,383 | 11/1953 | Siering et al. | 173/123 X |
| 2,970,483 | 2/1961 | Schrum, Sr. | 173/123 X |
| 2,974,533 | 3/1961 | Demo | 173/123 X |
| 3,837,410 | 9/1974 | Maxwell | 173/123 X |
| 3,924,692 | 12/1975 | Saari | 173/123 X |

FOREIGN PATENT DOCUMENTS

| | | | |
|---|---|---|---|
| 47823 | 10/1933 | Denmark | 173/123 |
| 1007148 | 4/1957 | Fed. Rep. of Germany . | |
| 2449191 | 5/1976 | Fed. Rep. of Germany . | |
| 612013 | 5/1978 | U.S.S.R. | 173/123 |

*Primary Examiner*—Werner H. Schroeder
*Assistant Examiner*—Andrew M. Falik
*Attorney, Agent, or Firm*—Michael J. Striker

[57] ABSTRACT

A hand-held power tool with an electric drive motor, by means of which a rotary sleeve impacting upon a tool retainer holding a tool can be rotatably driven by a transmission, and by means of which an impacting mechanism can furthermore be driven. The power tool includes an axially oscillating drive piston, an impactor impinged by the drive piston over an air cushion which will transmit its impact energy onto the tool. A translation drive acts upon the drive piston with a rotatably driven drive member with a curved guide. At least one actuator follows the curve guide and acts upon the drive piston to effect its axial displacement. The drive member consists of a drive sleeve coaxial with and concentrically enclosing the drive piston and the impactor. The drive sleeve has a guide surface closed in itself in the circumferential direction and has an essentially steadily rising or falling incline with curve maxima and curve minima. The actuator is designed as a separate and freely movable rolling or sliding body and is in immediate contact with the drive piston at a location adjoining the guide surface. The rolling or sliding body is prevented from deviating along the guide surface by means of a positive retainer securing these like a cage, but held in the axial direction with a degree of freedom required for following this guide surface.

68 Claims, 12 Drawing Figures

ROTATING DRIVE FOR IMPACT HAMMER

BACKGROUND OF THE INVENTION

The invention relates to a hand-held power tool, specifically an impact drill or hammer, particularly with an electric drive motor for the rotatory drive via a transmission, of a rotating sleeve impinging upon a tool holder in which a tool can be guided, and by means of which electric motor an impacting mechanism can also be driven. The impacting mechanism has an axially oscillating drive piston, an impactor actuated by the drive piston through an air cushion, the impactor imparting its impact energy to the tool, and also a translation drive acting on the drive piston. The translation drive has, on its part, a drive member which preferably can be driven in a rotary motion and is provided with a guide curve and at least one actuator which follows the guide curve and which will effect an axial displacement of the drive piston.

Such a hand-held power tool is known from DE Letter of Disclosure No. 244 9191. Therein, the drive motor, through a motor pinion engaging a gear, drives a swash plate being a component of an impacting mechanism, located, rigidly mounted, on an intermediate shaft, the latter on its part bearing a further gear engaging a gear provided on the rotary sleeve. The rotary sleeve in turn is also provided with gearing which engages the gearing at the offset of the tool holder thus effecting its rotatory drive. Thus, four gears are required at the side of the transmission, and furthermore two additional gears at the rotary sleeve and the offset subordinated to it. This plurality of gears is expensive, requires very much space within the machine, and will thus cause it to become costly overall, relatively large as well as heavy and, therefore, unwieldy. As for the transmission, it is a further disadvantage that the expenditure for bearings for all transmission components described, is considerable, and this also exerts a disadvantageous effect upon price, dimensions, and weight, of the machine.

The translation drive with its impacting mechanism also has numerous disadvantages. The transmitting member is represented by the swash plate which has a circular groove as its guide curve, running crosswise, but at an incline, to the drive axis of the swash plate. Located within this circular groove and rotatory relative to the swash plate is a ring as an actuator, having a projecting actuator pin acting upon a piston pin of the drive piston. The drive piston is non-rotatory. This construction of an impacting mechanism with translation drive is very expensive and will lead to relatively high manufacturing cost. Furthermore, it will require considerable space within the machine. It has an additional disadvantage that the force effecting the axially oscillating motion of the drive piston acts eccentrically onto the drive piston, thus subjecting the longitudinal guide to additional stress and additional wear.

One rotation of the swash plate as drive member will effect one axial blow upon the tool. For the attainment of a high number of blows, the swash plate must be driven at a relatively high speed. Since, on the other hand, the swash plate is subjected to stresses caused by strong forces, it must be so designed that it can sufficiently withstand such stresses also over a longer period. This will result in a solid and heaavy construction of the swash plate with the actuator guided on it. Thus, a relatively large rotating mass will result in this zone. In other respects, this construction is expensive and will also bring about a high weight of the machine.

SUMMARY OF THE INVENTION

The invention is based upon the task of creating a hand-held power tool as initially described, of simpler construction, lower cost, compact, lighter, smaller and, at the same time, of lower vibration, when compared to known types with an essentially simplified drive for the oscillating movement of the drive piston and the tool. In particular, the number of gears required for the transmission and of bearings required overall, is to be reduced. Concomitantly, the oscillating mass, and thus the exposure to vibration of the operator handling the machine, are to be reduced. With all this, the advantages offered by the air-cushion impact mechanism are to be retained, as well as the possibility of driving the tool not only by axial impacting, but also by rotation, simultaneous with, or independent from, the former.

In a hand-held power tool of the type noted initially, this task is solved, as per invention, by the driving member consisting of a drive sleeve co-axial to the drive piston and the impactor and concentrically surrounding by the drive sleeve having a guide surface closed in itself and provided with an essentially steadily increasing or decreasing incline with the maxima and minima of the curve pointing in an axial direction, by the actuator being constructed as a rolling or sliding member acting directly upon the drive piston at a location next to the guide surface, and by the rolling or sliding member, respectively, being retained in a cage-like positive retainer preventing free and uncontrolled deviation along the guide surface but allowing, in the axial direction, the degree of freedom necessary for following this guide surface.

This construction brings forth the conditions necessary to design the entire transmission and impacting mechanism as simple as possible, this being due to the drive sleeve which concentrically surrounds the drive piston and impactor. A special translation drive for the drive piston, to be located at a radial distance from the arrangement of the drive piston and impactor, is unnecessary, so that there is no requirement for space otherwise needed for it, for instance below the longitudinal center axis of the drive piston. Thus, the machine can be designed considerably more compact and smaller. Furthermore it can be constructed considerably simpler, lower in cost and lighter in weight. Regarding the transmission, it is merely necessary to provide the drive sleeve with a gear in mesh with a drive pinion of the drive motor.

Merely two gears are therefore necessary. This, and the concentric arrangement of the drive shaft will allow minimizing the number of bearing locations and requisite bearings. This will also have a favorable effect upon a reduction of construction dimensions, weight and price of the machine without having to forgo herein the advantages of the air-cushion impacting mechanism or of the availability of imparting the tool holder a rotatory movement or impacting blows for the tool. It is furthermore of advantage that the rotating mass can be reduced and the oscillating mass kept as small as possible so that the operator handling the machine will be subjected to smaller vibratory stress.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
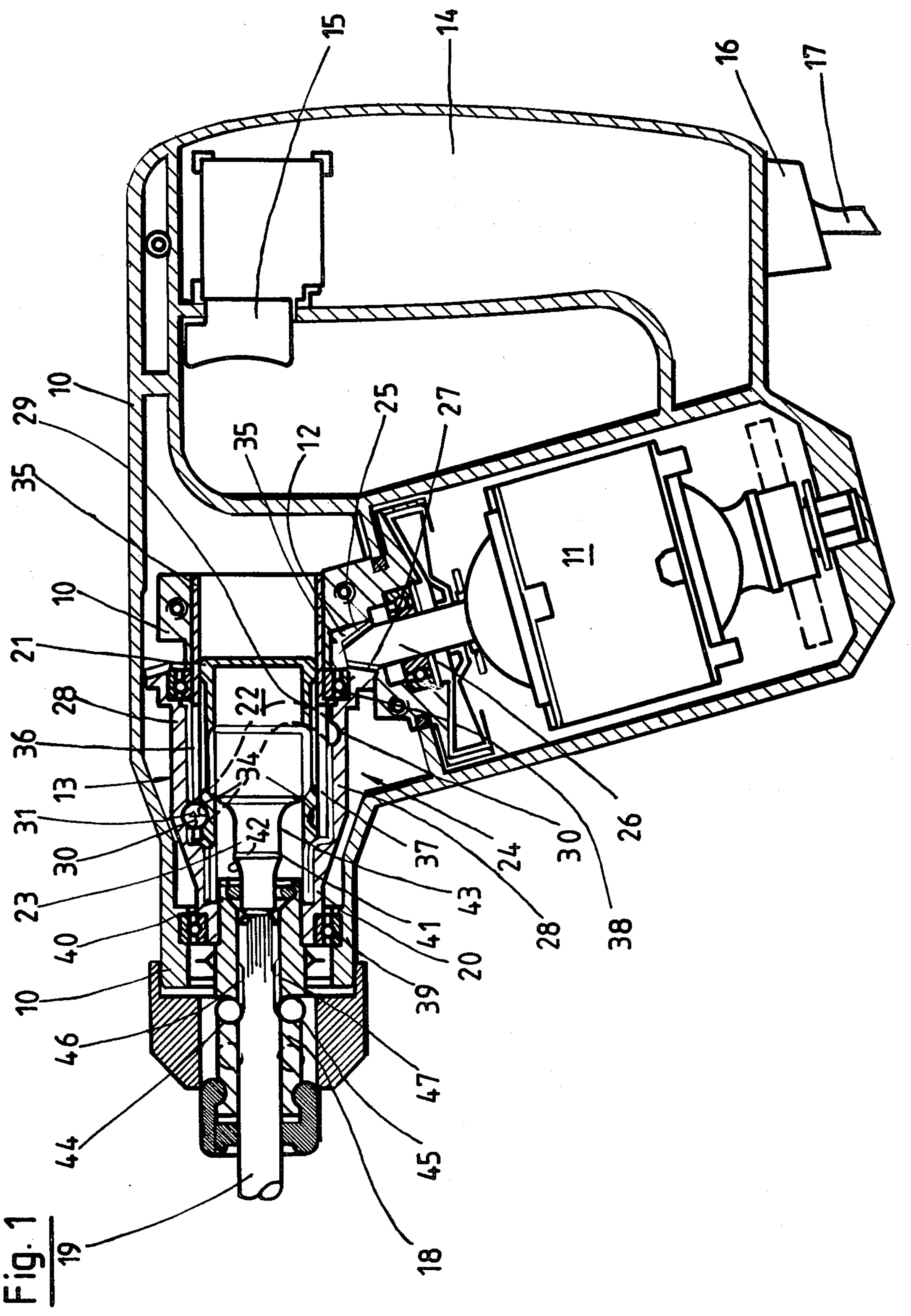
FIG. 1 a schematical, partially axial, longitudinal section of an impact drill as per a first embodiment, FIG. 1*a*, an enlarged view showing portions of a drive piston of a striking mechanism and of a drive sleeve of a driving member.

The impact drill shown in FIG. 1 has a housing 10, with an electric motor 11 designed as universal motor, and furthermore a transmission 12 and an impacting mechanism 13 arranged within it. At its rear end, the housing 10 transits into a handle 14 containing a switch with a trigger 15 by means of which the drive motor 11 can be put into operation. At the lower end of the handle 14, the power supply cord 17 is led in through the elastic grommet 16. At its front end, not facing the handle 14, the housing 10 is provided with a tool holder 18, serving to retain a tool 19, just indicated, f.i. a drill or chisel.

The tool holder 18 can be driven in a rotatable manner by a rotary sleeve 20 and a transmission 12 in the interior of the housing. The impacting mechanism 13 is also driven by the transmission 12. It has an axially oscillating drive piston 21 which, via the air cushion 22, acts upon the impactor 23. The latter imparts its impact energy directly upon the tool 19. Components of the impacting mechanism 13 are, furthermore, a translating drive 24 acting upon the drive piston 21, which will be explained more closely below, and a drive member with rotatory drive having a curve guide and two actuators following the curve guide and engaging the drive piston 21 in order to axially displace it.

A component of the transmission 12 is a beveled drive pinion 25 rigidly attached to the motor shaft 26.

The drive pinion 25 is in engagement with a ring gear 27 of the transmission 12. The motor shaft 12 is set at an obtuse angle to the longitudinal axis of the drive piston 21.

The driving member of the translation drive 24 consists of a drive sleeve 28, integral with the rotating sleeve 20. The latter is rigidly connected to the tool holder 18, or rigidly shrunk onto it. The tool holder 18, the rotating sleeve 20 and the drive sleeve 28 are thus axially adjoining and in coaxial alignment with each other. Herein, the drive sleeve 28 is arranged coaxial with the drive piston 21 and the impactor 23 and concentrically encloses both.

The drive piston 21 is designed as a hollow piston and provided with an axial piston sleeve 29, open and pointing towards the tool holder 18, with the impactor 23 being led within it sliding and forming a seal.

Figure 2:
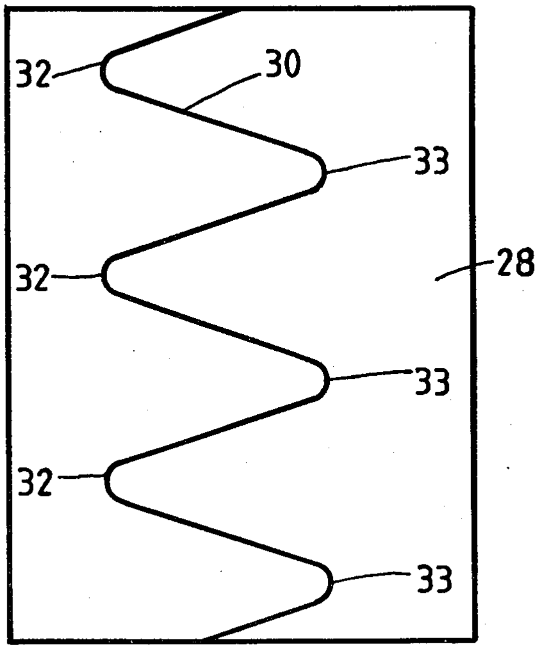
FIG. 2 is a schematic view of the developed internal circumferential area of the drive sleeve with a guide groove of the impact drill contained therein as per FIG. 1, FIG. 3 a schematical axial longitudinal section of a portion of an impact drill below the longitudinal center axis, as per a second embodiment, and above the longitudinal center axis as per a third embodiment, FIGS. 4 and 5 one respective schematical longitudinal section of a portion of an impact drill as per a fourth, or fifth respectively, embodiment, FIG. 6 a schematic side view with partial longitudinal section of an impact drill as per a sixth embodiment, FIGS. *7a*, *7b* and *7c* a half section along the line A—A in FIG. 6, and a quarter section respectively, along the lines B—B and C—C respectively in FIG. 6, once with activated impacting mechanism and in the other instance with deactivated impacting mechanism as per the sixth embodiments, FIG. 8 a schematic side view with partial axial section, of an impact drill attachment, and FIG. 9 a schematic side view with partial axial longitudinal section of a seventh embodiment of an impact drill.

On its internal circumferential area, the drive sleeve 28 is provided with a guide surface in the shape of a guide groove 30 with semicircular cross section. Two balls, of which only one ball 31 can be seen in FIG. 1, are running as actuators within the guide groove 30. In the circumferential direction, the guide groove is closed in itself and is provided around its circumference with an essentially steadily increasing or decreasing decline with curve maxima 32 and curve minima 33 pointing in the axial direction. As shown in FIG. 2, the guide groove 30 is of a sinusoidal course, located on the drive sleeve 28 somewhat in the manner of a tape. The course may, however, also deviate from the sinusoidal, and be designed asymmetrically, allowing a better adaption of the oscillating motion of the drive piston 21, as well as speed and acceleration to the prevailing necessities, f.i. so that the return stroke with the aspirating motion will ensue slower, and the forward stroke with compression and subsequent acceleration phase of the impactor 23 against the tool 19 will ensue faster. The number of alternating curve maxima 32 and curve minima 33 of the guide groove 30 is selected in such a way that for every full revolution of the rotating sleeve 28, three axial blows will be imparted upon the impactor 23 and thus the tool 19.

As can be recognized, the ball 31 directly engages the piston 21 at a location radially adjoining the guide groove 30. For this purpose, the drive piston 21 has on its piston sleeve 29, i.e. on its outer circumferential area, an actuating face designed as a circular groove 34 into which the ball 31 detents.

The balls, of which only the ball 31 can be recognized, are retained against free and uncontrolled deviating along the guide groove 30 by a positive retainer supporting them like a cage in the direction of rotation, and secured in the axial direction however in such a manner that the degree of freedom for following the guide groove 30 is maintained. The positive retainer consists herein of a guide sleeve 35, having for each of the two balls an essentially axially running guide slot 36 and 37. The ball 31 visible in the guide slot 36 is held somewhat cage-like, and in the other guide slot 37 the other ball, off-set f.i. by 180° in the circumferential direction and not visible herein.

The retaining in the guide slots 36 and 37 is made so that every ball 31 can be moved in the direction in which the guide slot 36 extends. Herein, the guide slots 36, 37 have an exactly axial course. They may, however, also be set instead at an incline against an assumed axial line on the cylinder barrel, f.i. at an acute angle, whereby it will also become possible that the oscillating motion of the drive piston 21, the speed and the acceleration may better be adapted to the prevailing necessities.

As can be recognized, the guide sleeve 35 is coaxial to the drive piston 21 with the piston sleeve 29, wherein the guide sleeve 35 concentrically encloses the drive piston 21 while simultaneously guiding it in its interior radially and axially. The drive sleeve 28 encloses the guide sleeve 35 at a radial distance and at least over that axial length over which the sinusoidal guide groove 30 extends. Every ball 31, or non visible ball, respectively, positively guided within its allotted guide groove 36 or 37, will radially protrude through the allotted guide slot, into the guide groove 30 on one hand, and into the annular groove 34 of the piston sleeve 29 on the other.

In the embodiment shown in FIG. 1, the guide sleeve 35 is rigidly held within the housing 10. At the same time it serves to support the drive sleeve 28, which is supported in the zone of the ring gear 27 on the stationary guide sleeve 35 by means of a ball bearing 38. At the left end in FIG. 1, support against the housing 10 is made in the zone of the rotating sleeve 20, also by means of a ball bearing 39.

At its side facing the impactor 23, the tool holder 18 is provided in its interior with a catching device in the shape of an O-ring 40, serving to catch the impactor 23 when the latter is in its expelled idling position, not shown. A component of this catching device is furthermore a radially projecting ring collar 41 with radially sloping shoulders 42 and 42 provided axially on both sides.

The tool 19 has on its inserted stem two axial grooves, into which a key, not shown, of the tool holder 18 will engage to transmit the rotation. Furthermore, at least two retaining balls 44, 45, are held within the tool holder 18, which will detent into axial recesses 46 and 47 respectively of the tool 19 in such a manner that the tool 19 is axially secured in the tool holder 18 so it cannot fall out, but will still be able to axially oscillate within it.

When the drive motor 11 is switched on, it will drive the ring gear 27, connected to the drive sleeve 28 rigidly against turning, the drive ensuing over the motor shaft 26 with the drive pinion 25. The rotatory drive of the tool 19 thus ensues over the drive of the drive sleeve 28 and the rotary sleeve 20 integral with the former and over the tool holder 18 connected to the latter rigidly. With such a revolution of the drive sleeve 28, the approximately sinusoidal guide groove 30, machined into it, will also rotate. The balls 31, prevented from rotation within the guide slots 36 of the stationary guide sleeve 35, will thereby be forced to travel within the sinusoidal guide groove 30 and will thus be axially displaced, alternatingly to the right or left. Since the balls 31 radially engage the annular groove 34 of the piston sleeve 29 in the direction of the interior, this will have as its consequence an oscillating displacement of the drive piston 21, and—via the air cushion 22—an impact drive at axial displacement to the left as per FIG. 1, acting upon the impactor 23 which, in its turn, will impart a blow to the end of the tool 19 facing it, so that the latter is subjected to axial impacts. If, when operated with the tool 19, the impact drill is pressed against, f.i., a wall, axial blows will be imparted to the tool 19, superimposed on its rotatory drive. Every time that the impactor 23 with its ring collar 41 has travelled in axial direction over the O-ring 40, with the latter becoming somewhat deformed thereby in the radial direction, the O-ring 40 will endeavor engaging the rear shoulder 43 in order to retain the impactor in this expelled idling position. By the axial pressure, acting in the axial direction onto the impactor 23 via the tool 19, the impactor 23 will be released in every instance from this arrested position and displaced to the right in FIG. 1, so that the impactor 23 will continually be imparted, via the air cushion 22, blows and acceleration to the left in the axial direction.

In the first embodiment a safety clutch may be provided to protect the operator and arranged, f.i. in the path of power between the ring gear 27 and the drive sleeve 28, or the rotary sleeve 20, or the tool holder 18.

The second embodiment, shown below the longitudinal center axis in FIG. 3, differs from the first embodiment only insofar that the motor shaft 126 with the drive pinion 125 is set parallel to the axis of the drive piston 121, and that, furthermore, instead of a ring gear on the drive sleeve 128, a spur gear 127 is rigidly attached thereon, being in mesh with the drive pinion 125.

Figure 3:
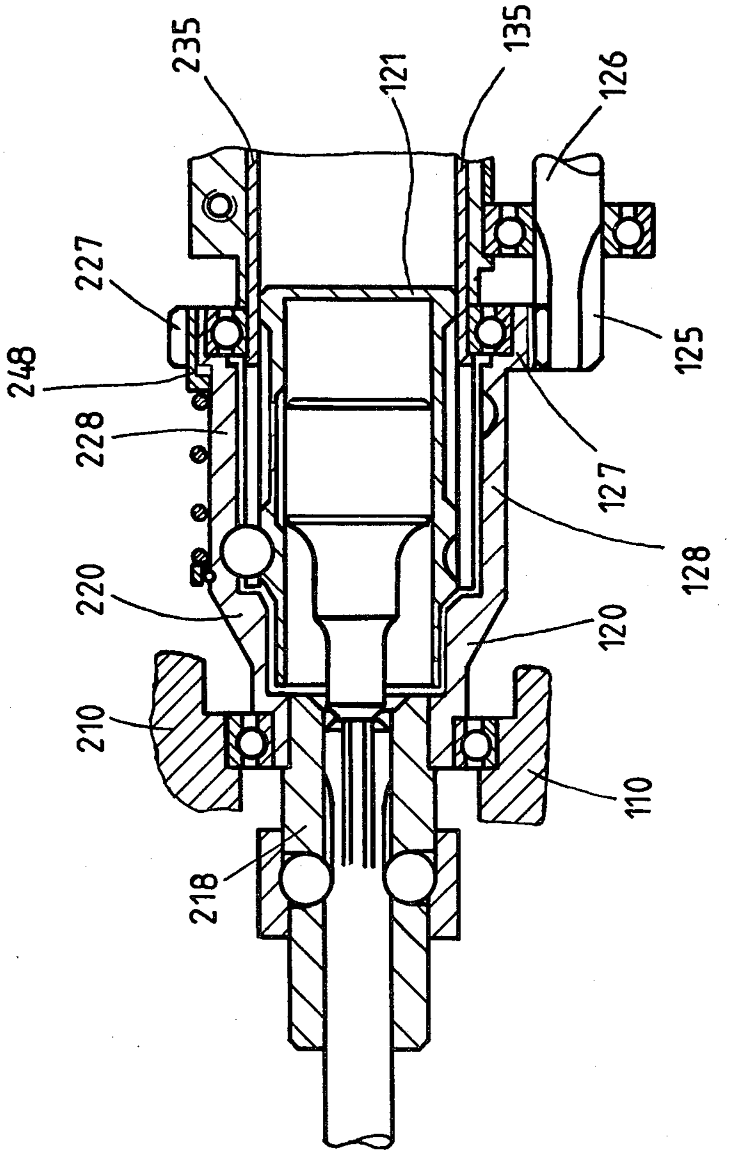

The third embodiment, shown in FIG. 3 above the center axis, differs from the second embodiment by the spur gear 227 not acting immediately upon the drive sleeve 228, an axially releasing safety clutch 248 of a type as known per se being interposed, which, on being actuated, will disengage the drive sleeve 228 from being co-rotating via the spur gear 227, with the latter continuing to revolve freely. If the safety clutch 248 responds in this manner, not only the impacting mechanism is being deactivated, but also the rotatory drive for the tool.

If, in a modification of the third embodiment, the safety clutch is interposed in the path of power between the drive sleeve 228 and, f.i., the rotary sleeve 220 or the tool holder 218, it can be attained that, on actuation of the safety clutch, only the rotatory drive for the tool will be deactivated, the impacting mechanism however continuing to work as heretofore and applying axial blows onto the tool.

Figure 4:
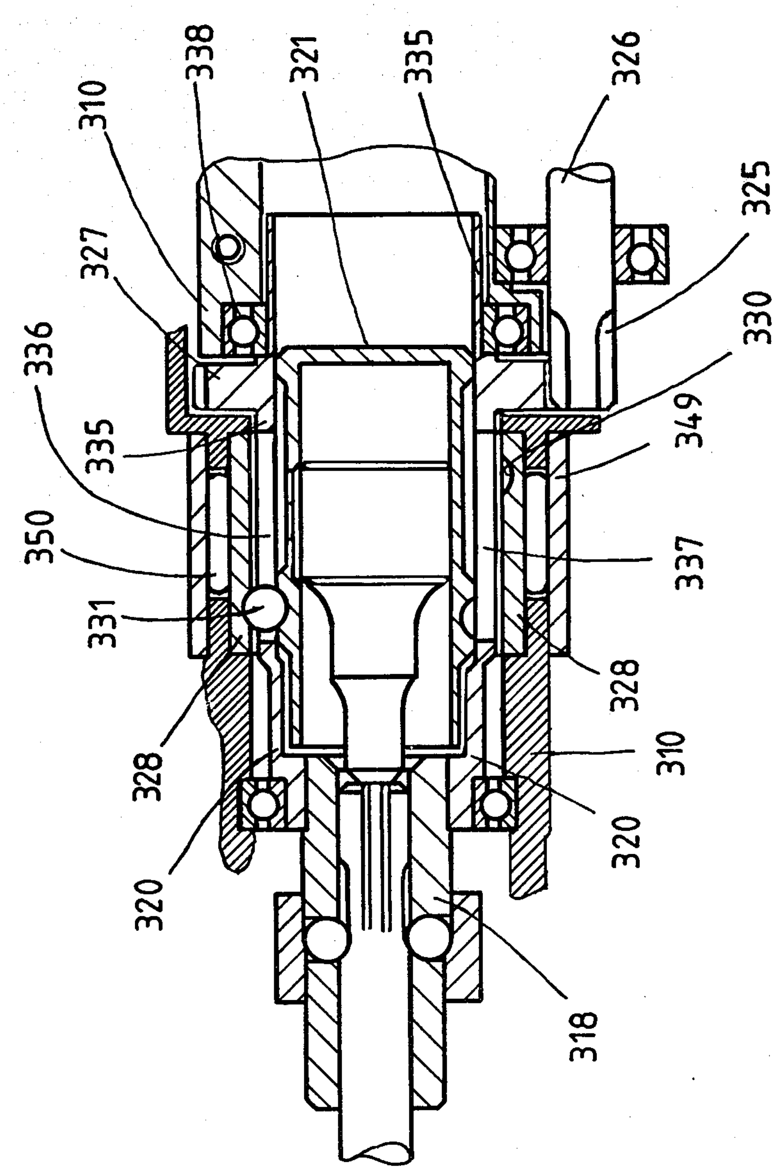

The fourth embodiment shown in FIG. 4 differs from the preceding embodiments inasmuch as herein the rotary sleeve 320 is now rigidly connected with the guide sleeve 335 instead of the drive sleeve 328, the former being on its part supported in the housing 310 by means of the ball bearing 338, in a manner allowing rotation. The spur gear 327, in engagement with the driven pinion 325 of the motor shaft 326 is, in this embodiment, connected with the guide sleeve 335 in a manner preventing rotation. The drive sleeve 328 is rigidly held within the housing 310 by means of a friction or positive clutch with, f.i. manual operation, and may be released for rotation by actuating this clutch. The clutch may consist f.i. of needle-like rotating bodies 350 arranged between an external shifting ring 349 and the external circumferential area of the drive sleeve 328 and furthermore of a not visible internal clamping surface on the external shifting ring 349. By rotating, the shifting ring 349 can be so adjusted that the rotating body 350 will exert a radial clamping power onto the drive sleeve 328, so that the drive sleeve 328 is then held rigidly against turning. Due to the rotatory drive of the drive sleeve 335, the balls 331 within the guide slots 336, 337 are forced to run through the guide groove 330 within the arrested drive sleeve 328, so that a drive piston 328 is driven in an oscillating manner, just as in the first embodiment. In this fourth embodiment as per FIG. 4, the drive conditions are merely reversed relative to the first embodiment as per FIG. 1. With an arrested drive sleeve 328, the rotatory drive for the tool will ensue simultaneously with the impact drive.

If the shifting ring 349 is rotated so that its internal clamping surface will radially move away from the revolving body 350, the clamping force acting radially upon the drive sleeve 328 is cancelled and the latter will be free to rotate conjointly with the driven guide sleeve 335 and the balls 331. Therein, no oscillating drive of the drive piston 321 will ensue. However, the tool will be subjected, as heretofore, to the rotatory drive over the guide sleeve 335, the rotating sleeve 320 in one piece with the former, and the tool holder 318. It is merely the impacting mechanism that is at a standstill.

In another embodiment, not shown, the clutch of the drive sleeve 328 as described, is designed with a positive, instead of a frictional engagement, f.i. in such a manner that a locking pin will radially engage a recess of the drive sleeve 328 in order to arrest it. The locking pin may be radially extracted in order to free the drive sleeve 328 for rotation. Other clutches with positive or frictional engagement, acting in the same manner, are within the framework of the invention.

Figure 5:
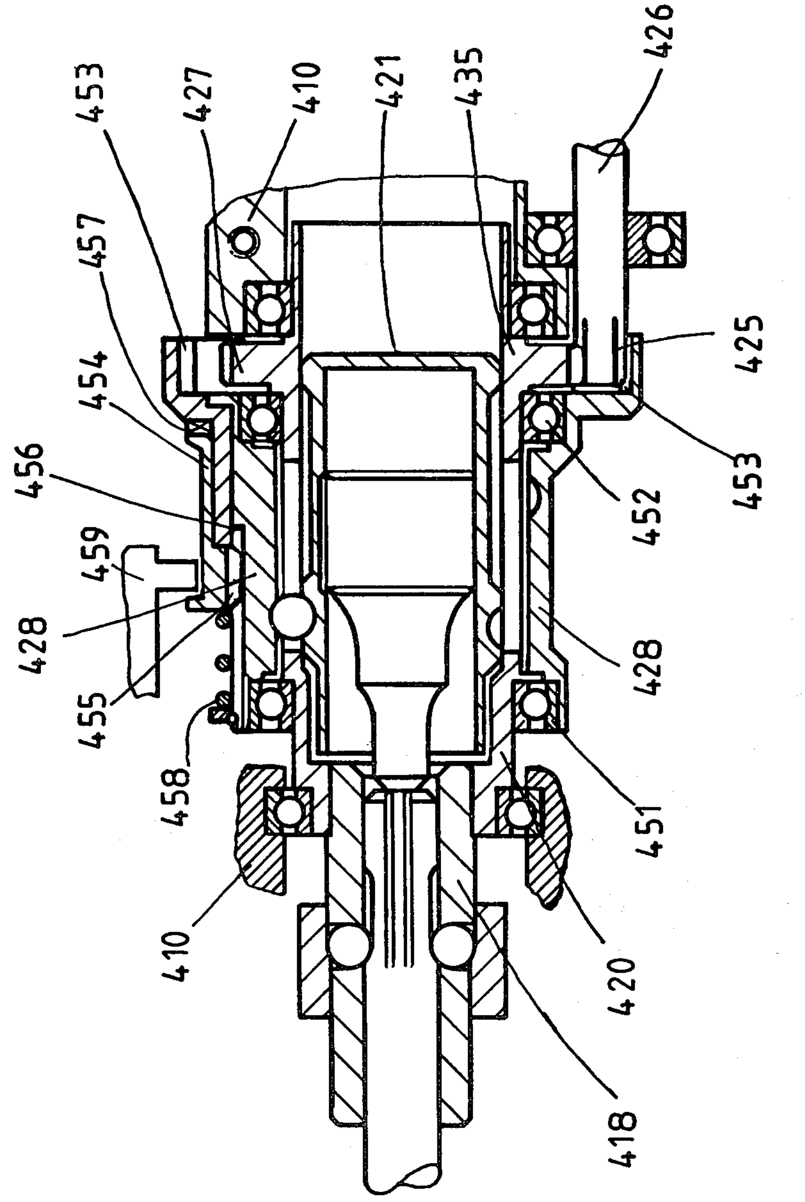
Figure 6:
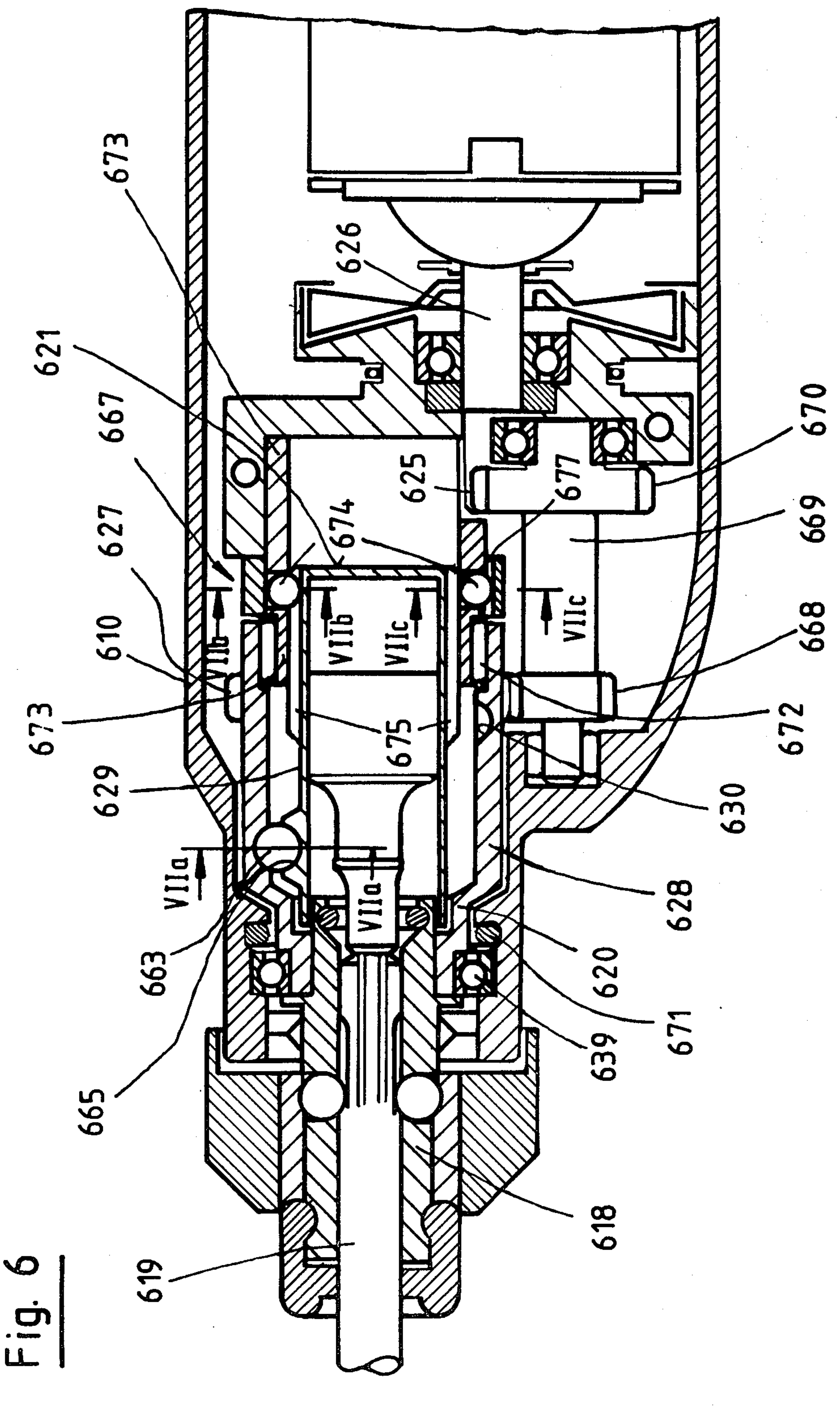

The embodiment shown in FIG. 5 somewhat commingles the elements of the third embodiment in FIG. 3 with those of the fourth embodiment in FIG. 4. Also, in the fifth embodiment in FIG. 5, the rotatory sleeve 420 is rigidly connected to the guide sleeve 435. Via the thus rigidly connected spur gear 427, the latter is driven by the drive pinion 425 on the motor shaft 426.

The drive sleeve 428 is rotatably supported on the rotary sleeve 420 and the guide sleeve 435 respectively, by means of two ball bearings 451, 452. In the embodiment shown below the longitudinal center axis, the drive sleeve 428 carries an internally geared drive wheel 453 rigidly connected with it against turning, with the teeth of the latter also being in mesh with the drive pinion 425 of the motor shaft 426. Thus, the drive sleeve 428 is herein also driven by the drive pinion 425, however opposite to the rotatory direction of the guide sleeve 435. This embodiment does not provide the activation by means of a clutch. It is of advantage, that herein, the ratio between the impact frequency and the rotatory speed of the tool need not, or has not to, be a integer multiple but may also be a fraction. This embodiment will allow that, depending upon the chosen number of teeth of the drive pinion 425, the spur gear 427 and the internally geared drive wheel 425. An optimal drilling performance can be selected and determined in respect of the drilling rate, and in respect of the smooth running of the impact drill, f.i. when drilling. The aforegoing will make it possible that with one revolution of the drive shaft 435, a frequency of impacts upon the tool can be attained which is a multiple by several times. In this embodiment, the tool is under rotatory drive over the guide sleeve 435 and the rotary sleeve 420 which are of one piece. If, instead, the rotary sleeve 420 is rigidly connected with the drive sleeve 428 the rotating of the tool will ensue over the drive sleeve 428.

A variation is shown above the longitudinal center axis in FIG. 5, allowing deactivation of the impacting mechanism wherein the tool continues under the rotatory drive transmitted by the guide sleeve 435 and the rotary sleeve 420. In this embodiment, the internally geared drive wheel 435 is not rigidly connected to the drive sleeve 428. Rather, a clutch component 454 is provided which detents with at least one internal radial tooth 455 into a subordinated axial groove 456 of the drive sleeve 458, and which may be axially displaced therein. The drive wheel 453 is rotatable relative to the drive sleeve 428. It has, for instance, an axial gearing 457 pointing towards the left in FIG. 5 with a subordinated dog axially engaging the clutch piston 454 towards the right in FIG. 5. Herein, the drive sleeve 428 is driven, namely over the drive sleeve 453, the axial gearing 457, the clutch part 454 and the radial tooth 454 which engages the axial groove 456. In this state, the same obtains as in the embodiment shown in FIG. 5 below the longitudinal center axis.

Stopping of the impacting is made by shifting with a dog 459, the clutch part 454 which may, f.i., be designed as a sliding sleeve, in an axial direction to the left as per FIG. 5, so that the clutch part 454 will be disengaged in an axial direction from the axial gearing 457 of the drive wheel 453. The latter continues herein to be driven by the drive pinion 425, but the rotatory drive for the drive sleeve 428 is then disconnected. The latter will corotate with the guide sleeve 435 if that is being driven, so that no axially oscillating drive motion is acting upon the drive piston 421. The rotatory drive for the tools will continue as heretofore over the guide sleeve 435 and the rotary sleeve 420.

Figure 8:
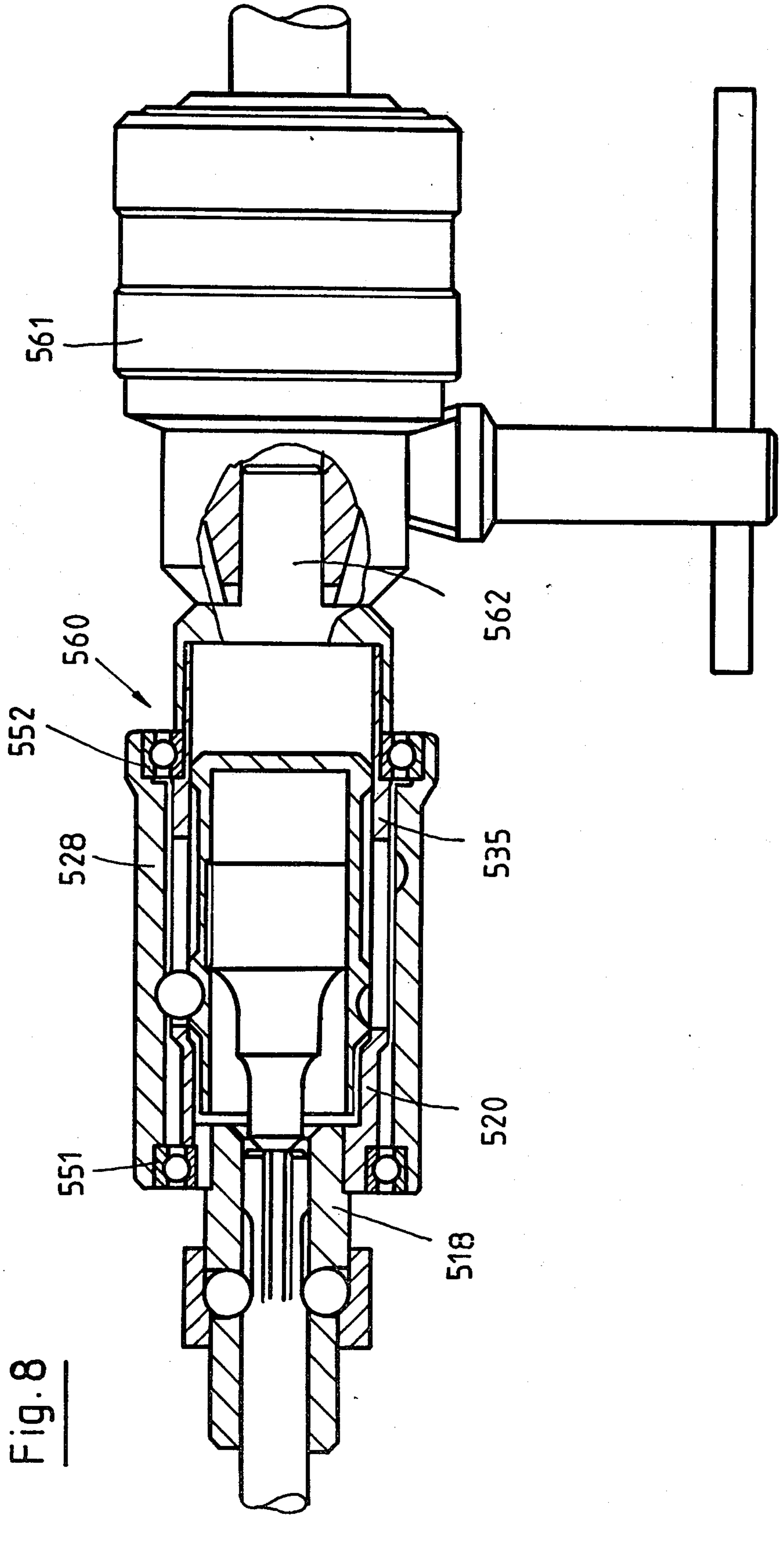

The embodiment shown in FIG. 8 utilizes the principle described above with an impact drill attachment 560, clamped by means of a dowel 562 into the chuck 561 of, f.i., a customary power drill. The guide sleeve 535 is connected rigidly to the dowel 562, the guide sleeve being of one piece with the rotating sleeve 520 which, in turn, is rigidly connected to the tool holder 518. The drive sleeve 528 is supported on the guide sleeve 535 by two ball bearings 551, 552, thus allowing its rotation, but held immovable in the axial direction. Insofar, the conditions correspond to the embodiment shown in FIG. 5 below the longitudinal center axis. For only rotatory drive, the drive sleeve 528 need not be grasped, so that it may revolve in the direction of rotation conjointly with the guide sleeve 535. The impacting mechanism is then deactivated. If the latter is to be activated, the drive sleeve 528 is grasped by hand and thus prevented from rotating.

All aforenamed embodiments as per FIG. 1–8 have in common that the drive shaft is provided on its internal circumference with the guide groove, shown in its development in a schematic in FIG. 2. Furthermore, the hollow piston of every embodiment is provided at the external circumference of its piston sleeve with a sunk-in annular groove, and provision is furthermore made for a guide sleeve with guide slots running essentially in an axial direction. The actuators will in all embodiments consist of, f.i., internally hollow balls. To centrally apply force to the drive piston, a minimum of two balls is provided, arranged in the circumferential direction at equal angular distances. Three, or more, balls may however be provided. The guide sleeve has a guide slot for every ball. The balls will on one hand engage the guide groove, and on the other hand will engage the annular groove of the piston sleeve. With the schematic representation of the guide groove in FIG. 2, three axial impacts will be imparted the tool 19 for every revolution of the tool. The following considerations have led to this design. If the guide groove is so shaped that only one blow is generated for every revolution of the tool 19, only one through notch will be generated on drilling. With a design wherein two blows are generated for every revolution, also only one through notch will result on drilling, repeating itself after 180°. With three blows per revolution, however, imparted to the tool 19, three through notches with a segmental angle of 60° will result. On four blows per revolution of the tool 19, only two through notches with a segmental angle of 90° will result. This shows that the design of the guide groove with three curve maxima 32 and three curve minima 33 is the most favorable, taking also into consideration that this will also render the impact drill to be of simple and extraordinarily light-weight construction. Three blows will be generated per every revolution. This is fully satisfactory for drills, f.i. in the diametral range between 5 and 12 mm, to allow achieveing a good rate of drilling and an essentially smooth operation.

In the sixth embodiment shown in FIG. 6 and 7*a*–7*c*, the guide sleeve of the preceding embodiments is missing. The piston sleeve 629 is, furthermore, provided on its external circumference not with an annular groove as an actuating surface for every ball 663, 664, but instead is provided with a radially recessed ball pocket 665 and 666 respectively, for each ball. A total of three balls are provided for in this embodiment, of which only the balls 663, 664 are visible. Three respective ball pockets are therefore provided on the piston sleeve 629. Within every respective ball pocket 665, 666, the ball 663, 664 allotted to it is so coupled to the drive piston 621 that it is axially and radially immovable. The positive retaining for the balls as initially explained, is herein, and for one, represented by the these ball pockets. As a further element of support against turning, the drive piston 621 is held rigid against rotation relative to the housing 610 by means of the shiftable clutch 667, whereby, with the clutch 667 released, the piston 621 may corotate relative to the housing 610, conjointly with the drive sleeve 628. In the latter instance, with the clutch 667 released, the rotatory drive motion for the tool 619 continues to be maintained, whilst the impacting mechanism is deactivated.

As with the preceding embodiments, the drive sleeve 628 is provided on its internal circumference with the guide groove 630. The drive sleeve 628 in also here joined integrally with the rotary sleeve 620 which, on its part, is rigidly connected to the tool holder 618. The drive sleeve 628 carries the drive wheel 627 rigidly mounted upon it. As in the preceding embodiments, the latter may be in mesh with the drive pinion 625 of the drive shaft 626, or, as shown here only as an example, be in engagement with the intermediate wheel 668 of an intermediate shaft 669, the latter carrying at an axial distance a gear 670 which is in mesh with the drive pinion 625. The drive sleeve 628 is supported on the housing 610 by means of the ball bearing 639 located in the zone of the rotary sleeve 620. The inner race of the ball bearing is axially and immovable clamped between the rotating sleeve 620 and the tool holder 618. The outer race of the ball bearing 639 rests against the housing 610 on one side immediately, and on the other side by means of an interposed buffer ring 671, f.i. an O-ring. The latter will attenuate the impacts generated within the tool and to be absorbed by the operator, whereby the tool may be operated more safely and smoother, and fatigue-free. Within the zone of the clutch 667, the drive sleeve 628 is supported by means of a simple needle bearing 672 which abuts against a portion of the clutch 667.

Figures 7A, 7B, 7C:
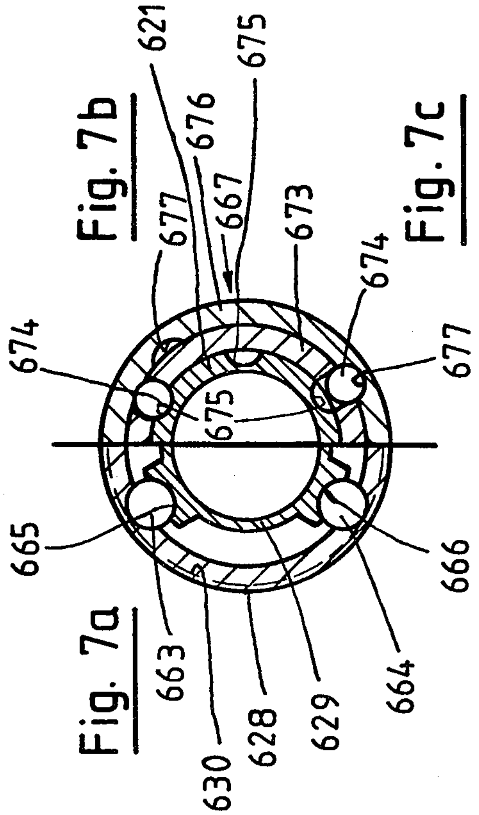

Details of the clutch may be seen particularly from FIG. 7*b* and 7*c*, the first-named of which showing the engaged position, and the second-named the released position with deactivated impacting mechanism. The clutch 667 is provided with a central ball cage 673 with the clutch balls 674 held therein, furthermore with ball grooves 675 running axially on the the drive piston 621 and serving for the engagement of one respective clutch ball, and furthermore with an external shifting ring 676 with rotatory actuation. The latter has on its internal surface holding pockets 677 for every clutch ball, which, with the clutch disengaged (FIG. 6 below the longitudinal central axis and FIG. 7*c*) will accommodate the clutch balls 674 radially exiting from the ball grooves 675. The central ball cage 673 of the clutch 667 is rigidly held against turning within the housing 610 and supports by means of the needle bearing 672 the drive sleeve 628, and furthermore, in its interior, the drive piston 621.

If the clutch is in released position as per FIG. 7*c*, the drive piston 621 is not held against rotation, but it may revolve, in the direction of rotation, conjointly with the drive sleeve 628 and the balls 663, 664, so that the impacting mechanism is thus deactivated, the tool 619 continuing, however, to be rotatively driven as heretofore. Rotating the shifting ring 676 from the rotational position as per 7*c* into that as per 7*b*, the clutch balls 674 will disengage the holding pockets 677 of the shifting ring 676. The clutch balls 674 are radially pressed inwards and into the ball grooves 675 of the drive piston 621. They will thereby couple the drive piston 721 with the rigidly held ball cage 673, so that in this position the drive piston 621 is held against rotation and will be imparted an oscillating motion upon a rotatory drive motion of the drive sleeve 621. The impacting mechanism is thus being activated.

Figure 9:
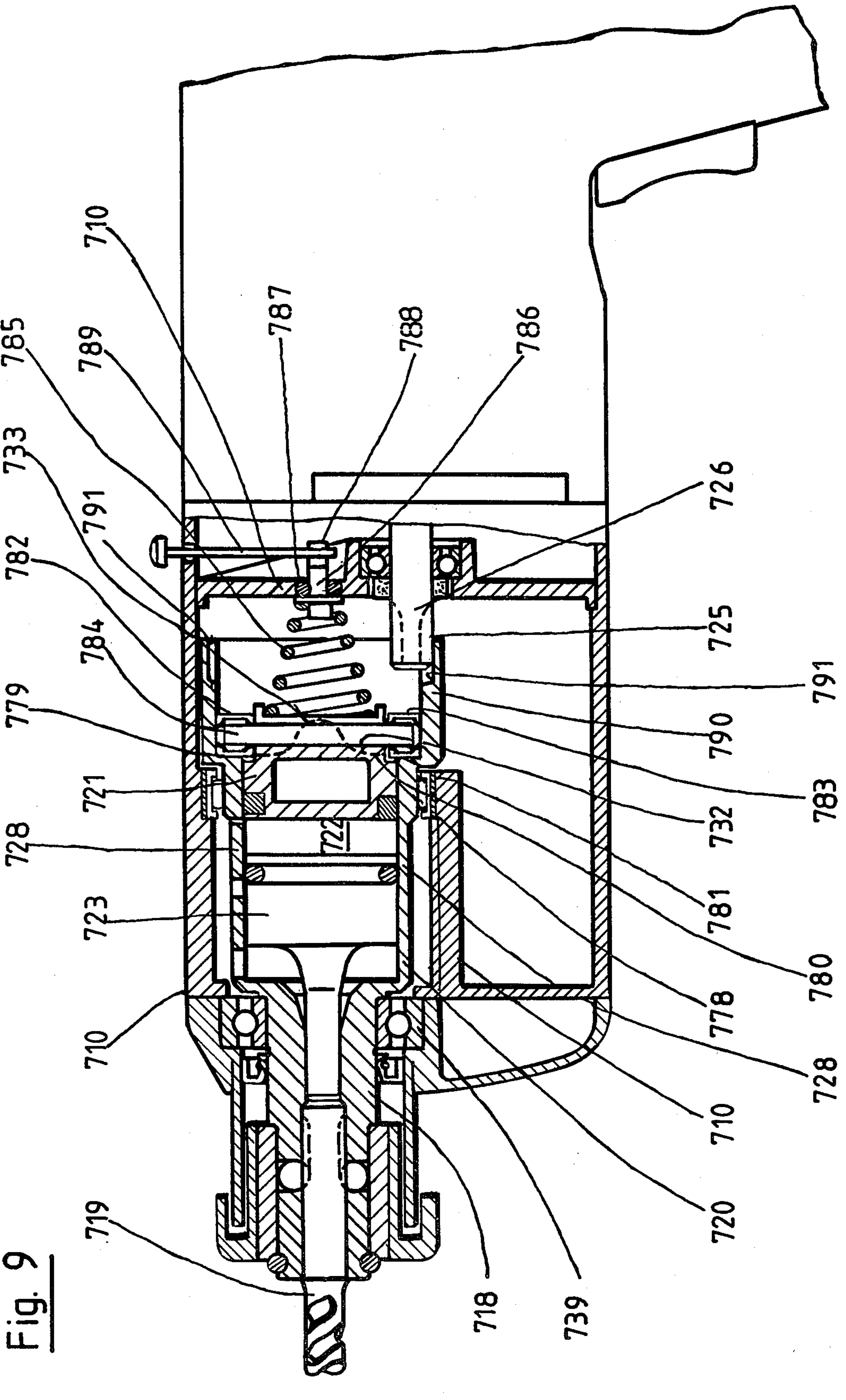

The seventh embodiment shown in FIG. 9, differs, f.i., from the first embodiment as per FIG. 1, for one by the drive sleeve 728 of the seventh embodiment being integral not only with the rotary sleeve 720, but integral also with the tool holder 718. This entire arrangement is supported within the housing 710, by means of the ball bearing 739 in the zone of the tool holder 718, and at an axial distance therefrom, by means of a roller bearing 778.

Within the drive sleeve 728, provision is made for the impactor 723 as well as the drive piston 721 in an axially successive arrangement and retaining these so they can slide and form a seal with their guide. The drive piston 721 is designed as hollow piston, but without a piston sleeve.

The guide surface, closed in itself in the circumferential direction with an essentially steadily rising and falling incline, with the curve maxima 732 and the curve minima 733, is located on an axial face area 779 on that side of the drive sleeve 728 not facing the tool 719 is constructed as an axial cam surface 780, and, for better visibility, shown in FIG. 9 only by a broken line. This axial cam surface 780 is located on a radially projecting ring collar 781 of a circumferential portion of the drive sleeve 728 which is not facing the impactor 723. Two rollers 782, 783 are provided here as actuators, their roller axes running radially and their spacing in the circumferential direction being at equal angular distances. The rollers 782, 783 follow the axial cam surface 780 and rest against it. The positive retaining for the rollers 782, 783 consists of a radial trunnion in the shape of a piston pin 784 which diametrically protrudes the drive piston 721 and is being held within it. At both ends, radially projecting over the drive piston 721, the piston pin 784 supports the rollers 782 and 783 respectively, which can rotate thereon. The piston pin 784 with the rollers 782, 783 is thus connected with the drive piston 721, non-rotatably in the circumferential direction. On that axial side not facing the impactor 723, an axial compression spring 785 acts against the drive piston 721, by means of which the rollers 782, 783 are being pressed against the axial cam surface 780. With its other end, the compression spring 785 will either firmly rest on the housing 710 and cannot be influenced or turned, this position not being shown, or it will sit upon a trunnion 786 with a ring collar 787, which can be rotated within the housing, the compression spring 785 on its part being retained thereon so it cannot rotate, the trunnion 786 on its part however, being optionally either set rotatable in the housing 710, or located so that it cannot turn relative to it. The trunnion 786 may then have for this purpose, f.i., a fork 788 on that side not facing the compression spring 785, with a manually operated locking pin 789 radially engaging the fork in order to arrest it. This engaged position is shown in FIG. 9. Then, the compression spring 785, and by way of it the drive piston 721 linked to it so it cannot turn are held within the housing 710 in a non-rotatable manner. A rotatory drive of the drive sleeve 728 will on one hand effect the rotatory drive of the tool 719, and on the other will simultaneously cause the axial cam surface 780 to rotate relative to the circumferentially restrained rollers 782, 783 and the restrained piston 721. The rollers 782, 783 run along the cam surface 780 whereby the drive piston 721 is imparted an axially oscillating motion.

If the locking pin 789 is radially pulled out from the fork 788, non-rotary abutment of the compression spring 785 against the housing 710 is inoperative. The compression spring 785 may rotate and thus also the drive piston 721. On rotary drive of the drive sleeve 728 this will cause the drive piston 721 to corotate with the latter and not to be subjected to the osciallatory drive. The impacting mechanism is deactivated, while the tool 719 continues to be under rotary drive as heretofore.

Herein, the transmission has, to the right of FIG. 9, on the sleeve-like extended part 790 of the drive sleeve 728, an internal gearing 791 which is in mesh with the drive pinion 725 of the axially parallel motor shaft 726.

The internal gearing 791 has the advantage that better mesh, and simultaneously a very small axial distance can be achieved between the drive piston 725 and the bearing 791. Instead of the internal gearing 791, an external gearing or a separate gear, ridigly mounted on the drive sleeve 728 may be in engagement with the drive piston 725.

It is of advantage that with at least two actuators arranged circumferentially at equal angular distances, and which will act upon the drive piston, the drive piston is impinged not by eccentrically acting forces but rather by centric forces. The embodiments with hollow piston and piston sleeve shown in FIGS. 1–8, allow, furthermore, an extremely short construction in the axial direction. This will reduce the size and the weight of the impact drill. The actuator, namely balls, or rollers respectively, can also be designed as rolling elements or sliding elements of different shape, f.i. rolls, sliding pieces etc. In order to hold the oscillating mass as small as possible, these actuators may be of hollow construction.

While in the embodiments as per FIGS. 1–8, all forces generated with oscillation will be possibly absorbed and supported by the guide tracks, this will be effected in the seventh embodiment as per FIG. 9 by the compression spring 785. The latter is of the advantage that it can be so designed that it will respond upon the maximum compression of the air cushion 722 between the drive piston 721 and the impactor 723, thus attenuating the maximum pressure, therebe rendering the impact drill softer and more convenient in its handling.

It will be understood that each of the elements described above, or two or more together, may also find a useful application in other types of constructions differing from the types described above.

While the invention has been illustrated and described as embodied in a hand-held power tool, specifically an impact drill or hammer, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Hand-held power tool, specifically an impact drill or hammer, with an electric drive motor, by means of which a rotary sleeve impacting upon a tool retainer holding a tool can be rotatably driven by a transmission, and by means of which an impacting mechanism can furthermore be driven, having an axially oscillating drive piston, an impactor impinged by the drive piston over an air cushion which will transmit its impact energy onto the tool, and having a translation drive acting upon the drive piston with a rotatably driven drive member, with a curved guide and at least one actuator following the curved guide and acting upon the drive piston to effect its axial displacement, characterized;

(1) by the drive member consisting of a drive sleeve (28; 728) coaxial with and concentrically enclosing the drive piston (27; 721) and the impactor (23; 723), (2) by the drive sleeve (28; 728) having a guide surface (30; 780) closed in itself in the circumferential direction and having an essentially steadily rising or falling incline with curve maxima (32, 734) and curve minima (33; 733), (3) by the actuator being designed as a separate and freely movable at least one displacing body (31; 782; 783) and being in immediate contact with the drive piston (21 or 721) at a location adjoining the guide surface (30 or 780), and (4) by the displacing body (31; 782; 783) being prevented from deviating along the guide surface (30 or 630 or 780) by a positive retaining means (35-37; 665; 677; 784; 785) securing the displacing body like a cage, but being held in the axial direction with a degree of freedom required for following this guide surface.

2. Power tool as per claim 1, characterized by the displacing body (782; 783) being formed as a rolling body.

3. Power tool as per claim 1, characterized by the displacing body (31) being formed as a sliding body.

4. Machine as per claim 1, characterized by the guide surface (30 780) having in the axial direction a sinusoidal course applied onto the drive sleeve.

5. Power tool as per claim 1, characterized by the guide surface (30, 780) having in the axial direction an asymmetric course deviating from the sinusoidal, applied onto the drive sleeve.

6. Power tool as per claim 1, characterized by the number of alternating curve maxima (32; 732) and curve minima (33; 733) on the guide surface (30; 780) being so selected that for every revolution of one of the rotating drive sleeve (28; 728) and the positive retaining means (335; 435; 535), a plurality of blows will be imparted to the impactor (23; 723) and thus onto the tool (19, 719).

7. Power tool as per claim 1, characterized by a plurality of displacing bodies (31; 782; 783) being arranged in circumferential direction at equal angular distances.

8. Power tool as per claim 1, characterized by the displacing body (782; 783) being designed as a roller.

9. Power tool as per claim 1, characterized by the displacing body (31) being designed as a ball.

10. Power tool as per claim 1, characterized by the displacing body (31; 782; 783) being designed as a sliding piece.

11. Power tool as per claim 1, characterized by the displacing body (31; 782; 783) being designed as a body with a hollow interior.

12. Power tool as per claim 1, characterized by the positive retaining means (35; 135; 235; 335; 435; 535; 665, 667; 784, 785) being arranged in the housing non-rotatably relative to the drive sleeve (FIGS. 1-3, 9).

13. Power tool as per claim 1, characterized by the positive retaining means (35; 135; 235; 335; 435; 535; 665, 667; 784, 785) being arranged rotatably driven relative to the drive sleeve (FIGS. 4, 5, 8).

14. Power tool as per claim 1, characterized by the positive retaining means (35; 135; 235; 435; 535; 665, 667; 784, 785) being arranged non-rotatably, and by a clutch (667; 785-789) releasing the positive retaining means from its non-rotatable position.

15. Power tool as defined in claim 1, characterized by at least two of the drive sleeve (28), the rotary sleeve (20) and the tool holder (18) being jointly turnable and in joint coaxial arrangement.

16. Power tool as defined in claim 15, characterized by at least two of the drive sleeve (28), the rotary sleeve (20) and the tool holder (18) being integral with one another for joint turning.

17. Power tool as per claim 15, characterized by at least two of the drive sleeve (28), the rotary sleeve (20) and the tool holder (18) being connected with one another for joint rotation.

18. Power tool as per claim 1, characterized by at least two of the rotatably driven positive retaining means (335; 435; 535), the rotary sleeve (320; 420; 520) and the tool holder (318; 418; 578) being jointly turnable.

19. Power tool as per claim 18, characterized by at least two of the positive retaining means (335; 435; 535), the rotary sleeve (320; 420; 520) and the tool holder (318; 418; 518) being integral with one another for joint turning.

20. Power tool as per claim 18, characterized by at least two of the positive retaining means (335; 435; 535), the rotary sleeve (320; 420; 520) and the tool holder (318; 418; 518) being connected with one another for joint turning.

21. Power tool as per claim 1, characterized by the drive sleeve (26; 128; 228; 428; 628; 728) having on its end not facing the impactor, coaxial gear means (27; 127; 227; 627; 453; 791) rigidly coupled to the drive sleeve, and by the drive motor having on its motor shaft (26; 126; 326; 426) a drive pinion (25; 125; 325; 425) which is in mesh with the gear means.

22. Power tool as per claim 21, characterized by the gear means being formed by internal gearing (453; 791) provided on the end of the drive sleeve.

23. Power tool as per claim 21, characterized by the gear means being formed by an external gearing (453; 791) provided on the end of the drive sleeve.

24. Power tool as per claim 21, characterized by the gear means being formed as a gear (27; 127; 227; 627) coaxial with the drive sleeve.

25. Power tool as per claim 24, characterized by the coaxial gear being formed by a spur gear (127; 227; 627).

26. Power tool as per claim 24, characterized by the coaxial gear being formed by a bevel gear (27).

27. Power tool as per claim 21, characterized by the gear means being directly and rigidly coupled to the drive sleeve (FIGS. 1, 3 below; 5 below; 6, 9).

28. Power tool as per claim 21, characterized by a safety clutch (248, FIG. 3 top) which couples the gear means to the drive sleeve.

29. Power tool as per claim 1, characterized by the guide surface being arranged on an axial face (729) of the drive sleeve (728) and shaped as an axial cam surface (780, FIG. 9).

30. Power tool as per claim 29, characterized by the axial cam surface (780) being arranged on a radially projecting ring collar (781) on a portion of the circumference of the drive sleeve (728) not facing the impactor (723).

31. Power tool as per claim 29, characterized bu the impactor (723) as well as the drive piston (721) being arranged in succession within the drive sleeve (728) and the rotary sleeve (720) rigidly connected to it, and in such a manner that they may slide and will form a seal.

32. Power tool as per claim 31, characterized by the drive sleeve (728) and the rotary sleeve (720) being of integral construction.

33. Power tool as per claim 29, characterized by a positive retaining means consisting of at least one radial dowel (784) having at its end the displacing body (782; 783) that can rotate about the dowel axis and runs on the axial cam surface (780), and by the dowel (784) being held rigidly versus the housing (710), and allowing itself to be pressed with its displacing body (782; 783) against the axial cam surface (780).

34. Power tool as per claim 33, characterized by a compression spring (785) pressing the dowel (784) with its displacing body (782; 783) against the axial cam surface.

35. Power tool as per claim 33, characterized by the dowel (784) being designed as a piston pin (721) diametrally penetrating the drive piston (721) and held within it with the displacing bodies (782; 783) arranged at either end.

36. Power tool as per claim 34, characterized by the dowel and the drive piston (721) being in abutment against the housing (710) under the action of the compression spring (785).

37. Power tool as per claim 36, characterized by the dowel (784) and the drive pinion (721) being releasable for rotation.

38. Power tool as per claim 29, characterized by the drive sleeve (728) with its integral rotary sleeve (720) and integral tool holder (718) being supported on one side in the axial zone of the tool holder (718), and the ring collar (781) with its axial cam surface (780) being supported on the other within the housing (710), both respectively by a bearing (739; 778).

39. Power tool as per claim 38, characterized by the bearing being formed by an anti-friction bearing (739).

40. Power tool as per claim 38, characterized by the bearing being formed by a roller bearing (778).

41. Power tool as per claim 1, characterized by the guide surface (30) being arranged in the internal circumferential area of the drive sleeve (28, FIGS. 1–8).

42. Power tool as per claim 41, characterized by the guide surface being constructed as a guide groove (30) with an approximately semi-circular cross section of the groove, and by providing as an actuator a plurality of balls (31) in engagement with guide groove (301).

43. Power tool as per claim 41, characterized by the drive piston (21) being designed as a hollow piston with an axial piston (29) sleeve pointing towards the tool holder (18) and being open at that end within which the impactor (23) can be guided, sliding and forming a seal.

44. Power tool as per claim 41, characterized by the piston sleeve (29; 629) having on its outer circumferential area an actuating surface (34; 665, 666) engaged with at least one ball (31; 663, 664) as an actuator (FIGS. 1–5, 8, 6).

45. Power tool as per claim 44, characterized by the actuating surface (34; 665, 666) being an annular groove with which at least one ball engages.

46. Power tool as per claim 41, characterized by the positive retaining being formed by a guide sleeve (35) containing for every ball (31) at least one essentially axially running guide slot (36) within which the ball (31) is kept cage-like, being however movable in the direction of the extent of the guide slot (36, FIGS. 1–5, 8).

47. Power tool as per claim 46, characterized by the guide slot (36) provided for every ball (31) being inclined at an acute angle relative to an assumed axial line on the cylinder barrel.

48. Power tool as per claim 46, characterized by the guide slot (36) provided for every ball (31) and being of a curve-like shape relative to an assumed axial line of the cylinder barrel.

49. Power tool as per claim 46, characterized by the guide sleeve (35) running coaxial to the hollow piston (21), with piston sleeve (29), concentrically enclosing the latter and guiding it within its interior.

50. Power tool as per claim 46, characterized by the drive sleeve (28) enclosing the guide sleeve (35) at a radial distance and at least over that axial length over which at least one guide slot (36) extends, and by every ball (31) positively guided in a guide slot (36) radially protruding through the guide slot (36), engaging on one side the guide groove (30) and on the other the annular groove (34).

51. Power tool as per claim 46, characterized by the rotary sleeve (20; 120; 220; 620; 720) with the drive sleevé (28; 128; 228; 628; 778) and by the drive sleeve having a gear and being supported at its end facing away from the tool holder, in a manner allowing rotation and engaging of its gear with a drive pinion of the motor shaft.

52. Power tool as per claim 51, characterized by the drive sleeve being supported with its end facing away from the tool holder, on the guide sleeve (35; 135; 235; 435; 535).

53. Power tool as per claim 46, characterized by the guide sleeve (35; 135; 235) being held within the housing so that it is secured against turning (FIGS. 1–3).

54. Power tool as per claim 46, characterized by the rotary sleeve (320; 420; 520) being rigidly connected with the guide sleeve (335; 435; 535) and by the guide sleeve being supported in the housing so that it can rotate, the guide sleeve carrying a drive (327; 427) which is in mesh with a drive pinion (325; 425) of the motor shaft (326; 426, FIGS. 4, 5).

55. Power tool as per claim 54, characterized by the drive sleeve (328; 428) being rigidly connected by means of one of a shiftable friction or a positive clutch (350; 454-459), but so held in the housing that it can be released for rotation (FIGS. 4, 5).

56. Power tool as per claim 55, characterized by the drive sleeve (428) which is arranged rigidly by means of the clutch (454; 459) but free to rotate upon release of the clutch, being coupled to a transmission gear (453) which conjointly with the drive gear (427) of the driven guide sleeve (435) is in mesh with the drive pinion (425) of the motor shaft (426) but can be driven.

57. Power tool as per claim 56, characterized by the transmission gear (453) being driven in the direction opposite to the drive gear (427) of the driven guide sleeve (435).

58. Power tool as per claim 41, characterized by the rotary sleeve (20) being rigidly coupled to the tool holder (18) and supported in the coupling zone within the housing.

59. Power tool as per claim 41, characterized terized by the piston sleeve (629) having as an actuating surface on its external circumferential area, a radially recessed ball pocket (665; 666) for every ball (663; 664) with every ball within the pocket which acts as a positive retainer, being coupled, immovable axially and circumferentially, with the drive piston (621), and by the drive piston (621) being retained by a shiftable clutch (667) rigidly against the housing (610) or with the clutch released (667) being rotatable relative to the housing (610), conjointly with the drive sleeve (628, FIG. 6).

60. Power tool as per claim 59, characterized by the clutch (667) having a central ball cage (637) with clutch balls (674) held therein, ball groves (671) arranged on the drive piston (621), into which one respective clutch ball (674) will engage, and also having an external shifting ring (676) with holding pockets (677) for every clutch ball (674) arranged on its internal circumference and serving to hold the clutch balls (674) radially exiting from the ball grooves (675) when the clutch (FIG. 7) is released.

61. Power tool as per claim 60, characterized by the ball grooves being arranged on the drive piston parallel to its axis.

62. Power tool as per claim 60, characterized by the ball grooves being arranged on the drive piston in the shape of a helix.

63. Power tool as per claim 60, characterized by the central ball cage (673) of the clutch (667) being held rigidly within the housing (610) and supporting the drive piston (621).

64. Power tool as per claim 1, characterized by the motor shaft with the drive pinion being arranged parallel to the longitudinal axis of the drive pinion (FIGS. 2–5).

65. Power tool as per claim 1, characterized by the motor shaft with the drive pinion being arranged at an angle to the longitudinal axis of the drive piston (FIG. 1).

66. Power tool as per claim 1, characterized by the tool holder (18) having in its interior, at the side facing the impactor (23), a catching device (401) for the impactor (23) when in its expelled idling position.

67. Power tool as per claim 64, characterized by the catching device having within the tool holder (181) a clamping ring (401) and having on the impactor (23) a rin collar (41) with radially sloping shoulders (42; 43) arranged axially at both sides.

68. Power tool as per claim 67, characterized by the clamping ring (40) being formed by an O-ring.

* * * * *